UNITED STATES PATENT OFFICE.

JOSEPH DEINET, OF ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

935,590.  Specification of Letters Patent.  Patented Sept. 28, 1909.

No Drawing.  Application filed May 15, 1909. Serial No. 496,113.

*To all whom it may concern:*

Be it known that I, JOSEPH DEINET, citizen of the German Empire, residing at Elberfeld, Germany, have invented new and useful Improvements in New Vat Dyestuffs, of which the following is a specification.

My invention relates to the production of a new anthracene derivative. It is obtained by converting diaminoanthrarufin into its dibenzoylated derivative. The reaction is carried out by treating diaminoanthrarufin with benzoyl chlorid.

Example: 10 parts of para-diaminoanthrarufin are heated to boiling for about half an hour with 100 parts of nitrobenzene and 40 parts of benzoyl chlorid. The new condensation product crystallizes from the cooling liquid in the shape of leaflets having a metallic luster which are filtered off and dried. It is soluble in pyridin with a violet color, in concentrated sulfuric acid with a brown color, which turns bluish-green. By treatment with hydrosulfite and NaOH an orange-red vat is obtained which dyes cotton, wool or silk blue shades.

I claim:

The herein described new vat dyestuff of the anthracene series which is the dibenzoyl-para-diaminoanthrarufin, which dyestuff is, after being dried and pulverized, a dark powder which is soluble in pyridin with a violet color; soluble in concentrated sulfuric acid with a brown color which turns bluish-green; giving an orange-red vat with hydrosulfite and caustic soda lye, which vat dyes the textile fiber blue shades, substantially as described.

In testimony whereof I have hereunto set my hand in the presence of two subscribing witnesses.

JOSEPH DEINET. [L. S.]

Witnesses:
 OTTO KÖNIG,
 C. J. WRIGHT.